United States Patent
Wolff

(10) Patent No.: US 6,773,041 B1
(45) Date of Patent: Aug. 10, 2004

(54) BEVELED ATTACHMENT FOR COUPLING PIPES

(75) Inventor: Steven K. Wolff, Mesa, AZ (US)

(73) Assignee: Patrick Wolff, Temeculah, CA (US)

( * ) Notice: Subject to any disclaimer, the term of this patent is extended or adjusted under 35 U.S.C. 154(b) by 0 days.

(21) Appl. No.: 10/172,634

(22) Filed: Jun. 14, 2002

Related U.S. Application Data

(60) Provisional application No. 60/298,323, filed on Jun. 14, 2001.

(51) Int. Cl.[7] ............................................. F16L 21/02
(52) U.S. Cl. .................. 285/374; 285/334.1; 29/890.14
(58) Field of Search .......................... 285/334.1, 374, 285/399, 400, 321; 29/890.14

(56) References Cited

U.S. PATENT DOCUMENTS

| | | | | |
|---|---|---|---|---|
| 1,122,422 A | * | 12/1914 | Ross ........................ | 29/890.14 |
| 1,492,520 A | * | 4/1924 | Meye ........................ | 285/374 |
| 1,492,521 A | * | 4/1924 | Meyer ........................ | 285/374 |
| 1,979,470 A | * | 11/1934 | Johnston ..................... | 156/182 |
| 1,985,325 A | * | 12/1934 | Nathan ....................... | 285/374 |
| 2,538,916 A | * | 1/1951 | Rudolph .................... | 285/334.1 |
| 2,770,476 A | * | 11/1956 | Cleverly ..................... | 285/374 |
| 2,935,343 A | * | 5/1960 | Ellis ........................... | 285/374 |
| 4,376,525 A | * | 3/1983 | Fremy ........................ | 285/321 |
| 6,454,310 B1 | * | 9/2002 | Wolff ........................ | 285/374 |
| 6,481,761 B2 | * | 11/2002 | Schroeder et al. ....... | 285/334.1 |

* cited by examiner

Primary Examiner—David Bochna
(74) Attorney, Agent, or Firm—Parsons&Goltry; Robert A. Parsons; Michael W. Goltry

(57) ABSTRACT

A pipe joint including a first pipe segment having a belled end and an annular gasket carried within the belled end, a second pipe segment having an end inserted into the belled end, passing through the annular gasket, and a beveled attachment carried by the end of the second pipe segment for facilitating the insertion of the end of the second pipe segment into the belled end of the first pipe segment passing through the annular gasket.

5 Claims, 2 Drawing Sheets

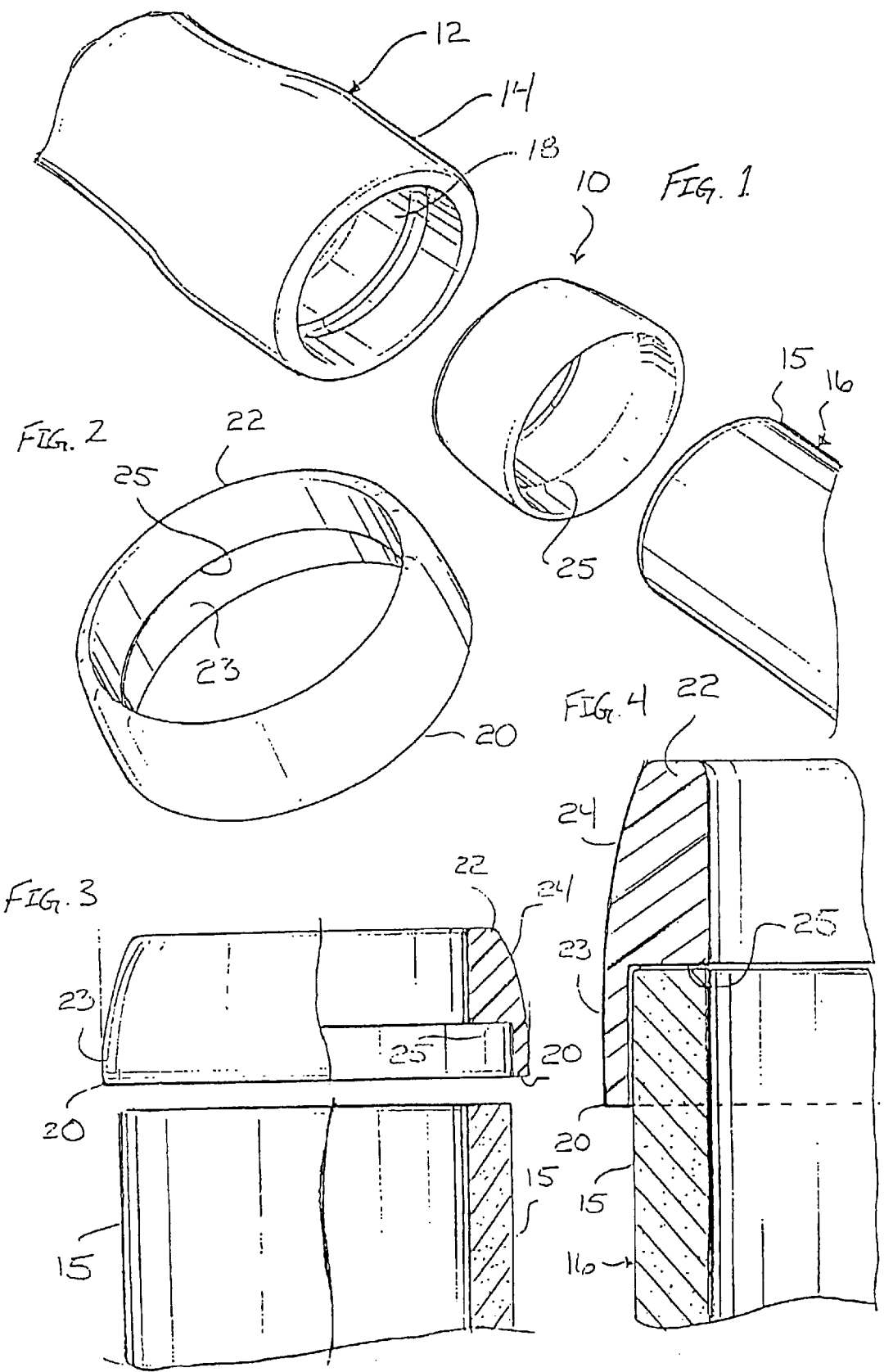

BEVELED ATTACHMENT FOR COUPLING PIPES

CROSS-REFERENCE TO RELATED APPLICATION

This application claims the benefit of U.S. Provisional Patent Application Serial No. 60/298,323, filed Jun. 14, 2001.

FIELD OF THE INVENTION

This invention relates to construction materials.

More particularly, the present invention relates to pipe couplings.

In a further and more specific aspect, the instant invention concerns devices for facilitating the coupling of pipes.

BACKGROUND OF THE INVENTION

Pipes have long been used for the delivery of various fluids, and the methods used for their installation are well-established. While the following invention can apply to many types of pipe for the delivery of many types of fluid, the following discussion will be focused upon liquid delivery, namely water pipes. Typically, water mains employ a type of pipe known as ductile iron. Lengths of pipe are coupled by inserting the end of one pipe into a belled end of an adjacent pipe. Using uncut lengths of pipe, this system works quite efficiently. However, problems develop when a length of pipe must be shortened by cutting. The cut end of the pipe has a relatively sharp edge which when inserted into the belled end of the adjacent pipe may damage the gasket located therein. This is typically referred to as "fish mouthing", and results in leakage at the joint.

Conventionally, this problem is overcome by cutting a bevel into the cut pipe end. This, however, creates more problems. Specifically, forming a bevel in ductile iron pipe is extremely difficult. Currently, the bevel is formed using the cut-off saw previously used to cut the pipe to the desired length. The saw used is cumbersome and heavy, has a blade turning at approximately 5600 rpms, and is therefore dangerous and imprecise. Furthermore, the blade manufacturers specifically prohibit this use of the blade, because the stresses are uneven and shattering of the blade tends to occur. As well as being dangerous, forming a bevel in this manner is expensive due to the time in labor and increased number of blades used.

A co-pending U.S. patent application Ser. No. 9/335,006, entitled "BEVELED INSERT FOR COUPLING PIPES", filed Jun. 14, 1999, overcomes many of the problems described. However, a portion of the insert is inserted into the pipes to be connected. This has a possibility of causing flow turbulence which may have long term impact.

It would be highly advantageous, therefore, to remedy the foregoing and other deficiencies inherent in the prior art.

Accordingly, it is an object of the present invention to provide a new and improved method and apparatus for coupling pipes.

Another object of the invention is to provide a beveled attachment, which permits insertion of a pipe end without damaging a sealing gasket.

And another object of the invention is to provide a device for facilitating the insertion of an end of a pipe into an adjacent pipe or fitting.

SUMMARY OF THE INVENTION

Briefly, to achieve the desired objects of the instant invention in accordance with a preferred embodiment thereof, provided is a beveled attachment including a collar portion having an attachment end and a beveled portion having a bevel end. The collar portion is receivable about a pipe end, and carries the beveled portion such that the attachment end and the bevel end form opposing ends of the beveled insert. A radially inwardly directed shoulder is defined intermediate the attachment end and the bevel end for abutting engagement with the pipe end.

In a more specific embodiment, provided is a pipe joint including a first pipe segment having a belled end and an annular gasket carried within the belled end. A second pipe segment has an end inserted into the belled end, passing through the annular gasket. A beveled attachment is carried by the end of the second pipe segment for facilitating the insertion of the end of the second pipe segment into the belled end of the first pipe segment passing through the annular gasket.

Further provided is a method of joining pipe segments employing the beveled attachment of the present invention.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 1 is a perspective exploded view of a beveled attachment according to the present invention, as it would appear at a pipe coupling;

FIG. 2 is a perspective view of a beveled attachment according to the present invention;

FIG. 3 is a plan view of the beveled insert carried by a cut pipe end;

FIG. 4 is a partial sectional view of the beveled insert;

DETAILED DESCRIPTION OF THE PREFERRED EMBODIMENTS

Figure 5:
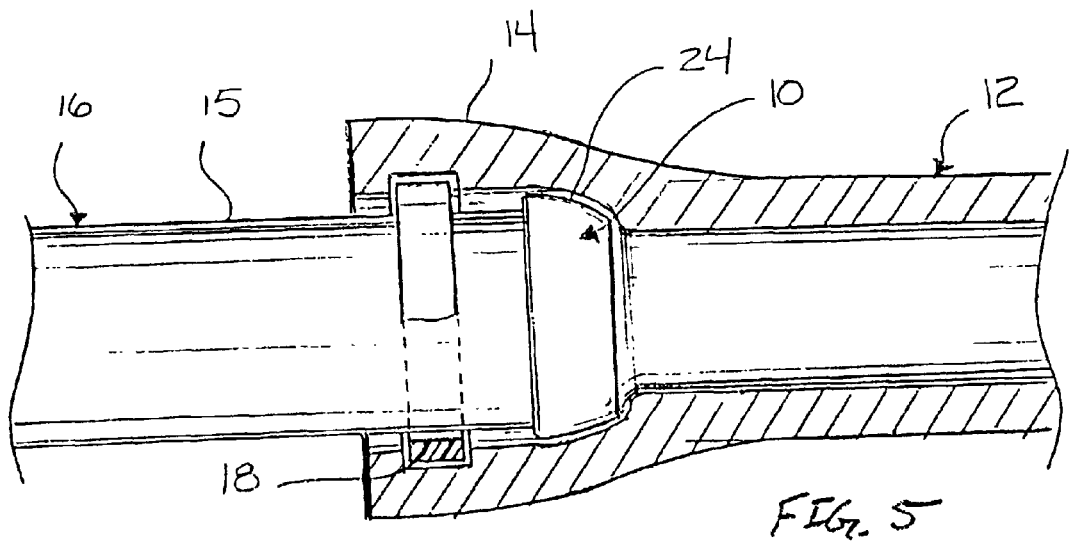
FIG. 5 is a side view illustrating a pipe coupling according to the present invention.

Turning now to the drawings in which like reference characters indicate corresponding elements throughout the several views, attention is first directed to FIGS. 1 and 5 which illustrate a beveled attachment generally designated 10 as it would appear in relation to a pipe joint. As will be appreciated by those skilled in the art, beveled attachment 10 is intended to facilitate the insertion of a pipe end into a receiving pipe end or pipe fitting. It will be understood by those skilled in the art that the beveled attachment can be used to couple a pipe to another pipe or to a pipe fitting. The term "pipe" as used in the following description and claims is intended to include both a pipe and a pipe fitting. Thus, the pipe may be constructed of virtually any material, and may be employed to carry substantially any material. For the purposes of the present description however, the pipe to be joined is preferably of the type referred to as ductile iron, and used primarily for water mains. It will also be understood that the present invention may be employed with substantially any diameter pipe.

Still referring to FIG. 1, a pipe segment 12 having a belled end 14 receives a cut end 15 of a pipe segment 16. Belled end 14 is of conventional manufacture and includes an annular gasket 18 carried therein. It should be pointed out that the term "belled" is used here to describe any pipe end which acts as a female fitting and is configured to receive another pipe end, and is intended to include pipes having an overall larger diameter than the inserted pipe. When a non-uniform length of pipe is required, a portion of a pipe segment must be removed by cutting, resulting in cut end 15. Conventionally, when inserting cut end 15 into belled end 14, damage will occur to annular gasket 18. To prevent damage to annular gasket 18 by cut end 15, often referred to as "fish mouthing", beveled attachment 10 is carried by cut end 15. By masking the sharp edges of cut end 15 with beveled attachment 10, pipe 16 can be inserted into belled end 14 through annular gasket 18 without any damage occurring thereto.

Figure 6:
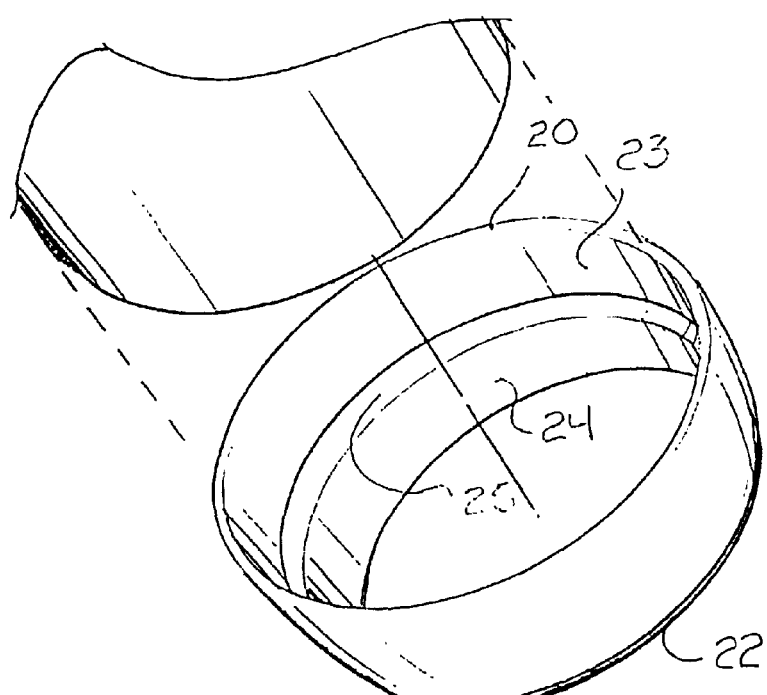
FIG. 6 is a perspective view of a beveled attachment according to the present invention.

Turning now to FIGS. 2 and 6, beveled attachment 10 is substantially annular in shape, and includes an attachment end 20 and a bevel end 22. Beveled insert 10 consists of a collar portion 23 at attachment end 20 and a beveled portion 24 at bevel end 22. Collar portion 23 has an inner diameter configured to be received about the outer surface of cut end 15 of pipe segment 16. Beveled portion 24 has an outer diameter substantially similar to an outer diameter of cut end 15 of pipe segment 16 proximate attachment end 20, and sloping to a lesser diameter at bevel end 22. The slope of the bevel may be of any pitch so as to efficiently pass annular gasket 18. The outer diameter of beveled portion 24 proximate bevel end 22 is less than the outer diameter of beveled portion 24 proximate attachment end 20 and less than the inner diameter of collar portion 23. Beveled portion 24 is preferably shallow so as to terminate with a blunt end at bevel end 22. It will also be understood that bevel end 22 can be a rounded chamfer.

Still referring to FIG. 2 with additional reference to FIGS. 3 and 4, a radially inwardly directed shoulder 25 is defined intermediate attachment end 20 and bevel end 22 by the different outer diameters of collar portion 23 and beveled portion 24. Shoulder 25 has a depth approximately the same as the thickness of pipe segment 16 at cut end 15. Beveled attachment 10 is coupled to cut end 15 of pipe segment 16 by sliding collar portion 23 over the outer surface of pipe segment 16 with cut end 15 abutting shoulder 25. In this manner the sharp edges of cut end 15 are masked during insertion of pipe segment 16 into belled end 14 of pipe segment 12. Thus, annular gasket 18 remains undamaged and will effectively engage and seal to pipe segment 16 as beveled attachment 10 passes completely through annular gasket 18. It should be noted that collar portion 23 must pass completely through gasket 18 during insertion as can be seen with reference to FIG. 5. In this manner gasket 18 will seal against the outer surface of pipe segment 16. A complete seal may not form if collar portion 23 is partially engaging gasket 18.

In this embodiment, beveled attachment 10 is preferably constructed of plastic materials such as high density polyethylene, PVC, and the like, molded in an integral piece. However, as will be understood by those skilled in the art, other materials such as metal, resins, composites, etc. may be employed.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

What is claimed is:

1. A method of joining pipe segments comprising the steps of:

providing a first pipe segment having a belled end and an annular gasket carried within the belled end;

providing a second pipe segment having an end;

providing a beveled attachment;

installing the beveled attachment about the end of the second pipe segment; and inserting the end of the second pipe segment into the belled end, with the beveled attachment passing entirely through the annular gasket.

2. A method as claimed in claim 1 wherein the step of providing a second pipe segment having an end includes cutting the pipe segment to form the end.

3. A method as claimed in claim 1 wherein the step of providing the beveled insert includes providing a beveled insert including:

a collar portion having an attachment end, the collar portion receivable about the end of the second pipe segment;

a beveled portion having a bevel end;

the collar portion carrying the beveled portion such that the attachment end and the bevel end form opposing ends of the beveled attachment; and a radially inwardly directed shoulder defined intermediate the attachment end and the bevel end for abutting engagement with the end of the second pipe segment.

4. A method as claimed in claim 3 wherein the step of providing a collar portion includes providing a collar portion has an inner diameter greater than an outer diameter of the second pipe segment.

5. A method as claimed in claim 4 wherein the shoulder has a depth approximately identical to a wall thickness of the second pipe segment.

* * * * *